(No Model.)
F. P. HINDS.
WIRE CHAIN.
No. 392,558. Patented Nov. 6, 1888.
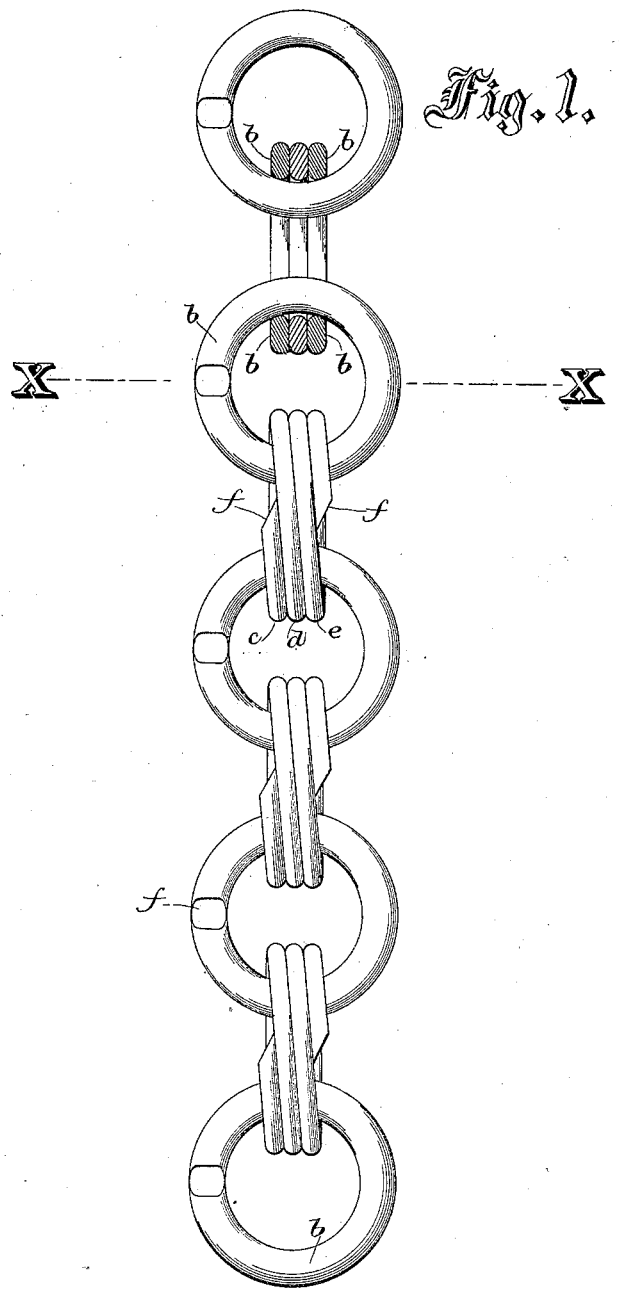
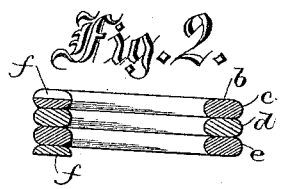
Witnesses
Eben Hutchinson
R. W. Estopker
Inventor
Franklin P. Hinds,
per Eugene Humphrey,
his atty.

UNITED STATES PATENT OFFICE.

FRANKLIN P. HINDS, OF GROTON, MASSACHUSETTS.

WIRE CHAIN.

SPECIFICATION forming part of Letters Patent No. 392,558, dated November 6, 1888.

Application filed September 19, 1887. Renewed September 25, 1888. Serial No. 286,386. (No model.)

*To all whom it may concern:*

Be it known that I, FRANKLIN P. HINDS, of Groton, in the county of Middlesex and State of Massachusetts, have invented a new and useful Improvement in Wire Chains, which will, in connection with the accompanying drawings, be hereinafter fully described, and specifically defined in the appended claims.

Figure 1 is a view of a section of wire chain embodying my invention. Fig. 2 is a horizontal section taken through one of the coiled links of the chain, as on line $x\ x$, Fig. 1.

The chain thus illustrated is composed of a concatenation of spirally-coiled links formed of flattened wire and interlinked with each other in the process of coiling. The coils $c\ d\ e$, which constitute a link, and which links may be of varying diameters, according to the size of the wire used, are so formed that the flattened sides $b$ of the wire are adjacent to each other, as shown. The links may be formed of round wire, but flattened wire is preferable, as by its use the coils are more compact and the links narrower, which is desirable, and larger contact-surface between the adjacent sides of the coils is secured, which will be advantageous when the chain is tinned or galvanized after it is completed, as may be done when desired, to strengthen it by so soldering the coils together, and to protect the surface of the wire from oxidation. When the coiled links are severed from the line of wire from which they are thus formed, they are so cut as to leave the ends $f\ f$ beveled, as shown. The ends being thus formed, renders the chain free from liability to catch and cling to any object over or through which it may be drawn—as, for instance, over a pulley or through an eye—and when the chain is coiled about itself or piled in a mass it, by reason of the roundness of its links and the beveled ends of its coils, freely straightens out without kinking or snarling when handled. The chain so constructed is light, strong, and exceedingly flexible, the latter quality rendering it unusually well adapted to running over pulleys.

I claim—

1. A chain composed of short sections of spirally-coiled wire interlinked, substantially as shown and described.

2. A chain composed of interlinked coils of wire having flattened sides $b$ and beveled ends $f$, substantially as specified.

FRANKLIN P. HINDS.

Witnesses:
 EUGENE HUMPHREY,
 EBEN HUTCHINSON.